United States Patent
Zhu et al.

(10) Patent No.: US 9,936,478 B2
(45) Date of Patent: Apr. 3, 2018

(54) DUAL REGISTRATION COORDINATION FOR TUNE AWAY

(71) Applicants: Verizon Patent and Licensing Inc., Arlington, VA (US); Cellco Partnership, Basking Ridge, NJ (US)

(72) Inventors: Lily Zhu, Parsippany, NJ (US); Andrew E. Youtz, Princeton, NJ (US); Christopher M. Schmidt, Branchburg, NJ (US); Jignesh S. Panchal, Somerset, NJ (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 664 days.

(21) Appl. No.: 14/286,671

(22) Filed: May 23, 2014

(65) Prior Publication Data

US 2015/0341897 A1   Nov. 26, 2015

(51) Int. Cl.
*H04W 88/06* (2009.01)
*H04W 68/00* (2009.01)
*H04W 60/00* (2009.01)
*H04W 60/06* (2009.01)

(52) U.S. Cl.
CPC ........ *H04W 68/005* (2013.01); *H04W 60/005* (2013.01); *H04W 60/06* (2013.01); *H04W 88/06* (2013.01)

(58) Field of Classification Search
None
See application file for complete search history.

(56) References Cited

U.S. PATENT DOCUMENTS

| | | | | |
|---|---|---|---|---|
| 2007/0072643 A1* | 3/2007 | Jiang | ............... | H04W 36/0083 455/560 |
| 2007/0258436 A1* | 11/2007 | Kulkarni | ............... | H04W 4/26 370/352 |
| 2011/0317635 A1* | 12/2011 | Swaminathan | ... | H04W 36/0088 370/329 |
| 2012/0063500 A1* | 3/2012 | Wang | ............... | H04L 1/0026 375/224 |
| 2012/0190373 A1* | 7/2012 | Tenny | ............... | H04W 56/0015 455/447 |
| 2012/0270545 A1* | 10/2012 | Zhao | ............... | H04W 72/00 455/435.1 |
| 2013/0023275 A1* | 1/2013 | Mutya | ............... | H04W 88/06 455/452.1 |
| 2013/0148527 A1* | 6/2013 | Awiniyi | ............... | H04W 24/02 370/252 |
| 2013/0267267 A1* | 10/2013 | Mujtaba | ............... | H04W 36/0066 455/509 |
| 2013/0286853 A1* | 10/2013 | Shi | ............... | H04W 24/02 370/242 |
| 2014/0308986 A1* | 10/2014 | Yang | ............... | H04W 88/06 455/552.1 |
| 2015/0237597 A1* | 8/2015 | Kanamarlapudi | .... | H04W 68/02 455/458 |

\* cited by examiner

*Primary Examiner* — Gregory Sefcheck
*Assistant Examiner* — Jenkey Van (57) ABSTRACT

A method, a device, and a non-transitory storage medium having instructions to receive tune away data from a multimode mobile device and to adjust network processes based on the tune away data including downlink scheduling, uplink scheduling, and handover procedures.

20 Claims, 8 Drawing Sheets

DUAL REGISTRATION COORDINATION FOR TUNE AWAY

BACKGROUND

A mobile device may dual register in multiple networks, such as a Long Term Evolution (LTE) network and a Code Division Multiple Access (CDMA) network. Under such circumstances and in the absence of circuit switch fall back, when the mobile device is camped on the LTE network, the mobile device tunes away to the CDMA network to check for voice pages due to its inability to use multiple wireless technologies simultaneously.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

A multimode mobile device includes multiple wireless communicative capabilities. For example, the multimode mobile device may include LTE and CDMA (e.g., 1× Radio Transmission Technology (RTT)) communicative capabilities. However, the multimode mobile device may use (e.g., tune into) only one of its wireless capabilities during a given instant in time. For example, the multimode mobile device may dual register in both the LTE and the CDMA networks. When the multimode mobile device is camped on the LTE network, the multimode device tunes away to the CDMA network to check for pages for a short duration. For example, the tune away process is based on the CDMA slot paging cycle and may be frequent. Additionally, the occurrence of tune away is not necessarily uniform amongst multimode mobile devices. For example, the tune away process may be dependent on factors such as the Mobile Identification Number (MIN), a hashing algorithm, a paging slot cycle index configured at the 1×RTT base station (BS), the radio frequency (RF) condition the multimode mobile device is in, as well as other activities the multimode mobile device has to perform on the tuned technology (e.g., look for page, perform a re-registration, etc.).

As a result of the foregoing, the tune away process may adversely impact end user communication pertaining to the other network that the multimode mobile device is also registered. For example, the tune away process may disturb LTE operations and reduce data throughput when the multimode mobile device tunes away to the CDMA network. For the sake of simplicity, the term "mobile device" is used in this description to indicate a multimode mobile device. As such, the mobile device includes multiple wireless communicative capabilities, but may use only one of its wireless capabilities during a given instant in time.

According to an exemplary embodiment, a wireless node is informed of the type of mobile device that will perform tune away. For example, the mobile device transmits information, which identifies the type of mobile device, to the wireless node. According to an exemplary implementation, the information includes the International Mobile Subscriber Identity/Type Allocation Code (IMSI/TAC) of the mobile device or a portion thereof. The mobile device may transmit this information by piggybacking this information with a message (e.g., an existing standardized message), using a proprietary message, or using a new standardized message.

According to an exemplary embodiment, the wireless node monitors the tune away behavior of the mobile device based on messages received from the mobile device. According to an exemplary embodiment, the wireless node receives messages from the mobile device that indicates when the mobile device is tuning away. According to another exemplary embodiment, the wireless node receives messages from the mobile device that indicates when the mobile device is tuning away and when the mobile device is tuning back. According to yet another exemplary embodiment, the wireless node detects on its own when the mobile device is tuning away or tuning away and tuning back. According to an exemplary embodiment, the type of messages is a part of the network standard. For example, in the context of an LTE network, the messages that carry tune away information are included in Channel State Information (CSI) reports. According to another exemplary embodiment, the type of messages is not a part of the network standard. For example, the messages may be of a new type that is not a part of the network standard.

According to an exemplary embodiment, the wireless node determines a tune away pattern of the mobile device based on the messages received from the mobile device. For example, the mobile device may send absolute tune away information, which includes a periodicity offset of the tune away start relative to a reference. For example, the mobile device may process tune away configuration information, which is received from the other network and provide this information to the wireless node. By way of further example, in the context of an LTE network, the mobile device may send tune away information, which includes a periodicity offset of the tune away start relative to an LTE reference (e.g., an LTE frame reference). Alternatively, the mobile device may transmit the tune away configuration information to the wireless node. In a similar manner, the mobile device may transmit messages pertaining to tuning back.

According to another exemplary embodiment, the mobile device transmits messages repeatedly and the wireless node would estimate the tune away periodicity and/or start time. For example, each message may carry one or multiple bits to indicate tune away start information. In a similar manner, the wireless node may estimate tuning back.

According to an exemplary embodiment, the wireless node can make proper adjustments to its maintenance of mobile device wireless (e.g., radio frequency (RF)) statistics monitoring, power control decisions, and appropriate scheduling decisions based on the determined tune away pattern of the mobile device. By way of example, an enhanced Node B (eNB) of an LTE network may be configured so that uplink (UL) and/or downlink (DL) scheduling takes into account tune away operations by the mobile device. Additionally, for example, the wireless node may make other types of adjustments pertaining to measurement report configurations, handover processes, etc., for which the tune away behavior is accounted. Still further, the wireless node may be able to differentiate this type of mobile device from a non-tune away mobile device that is under a deep RF fade.

Figure 1:
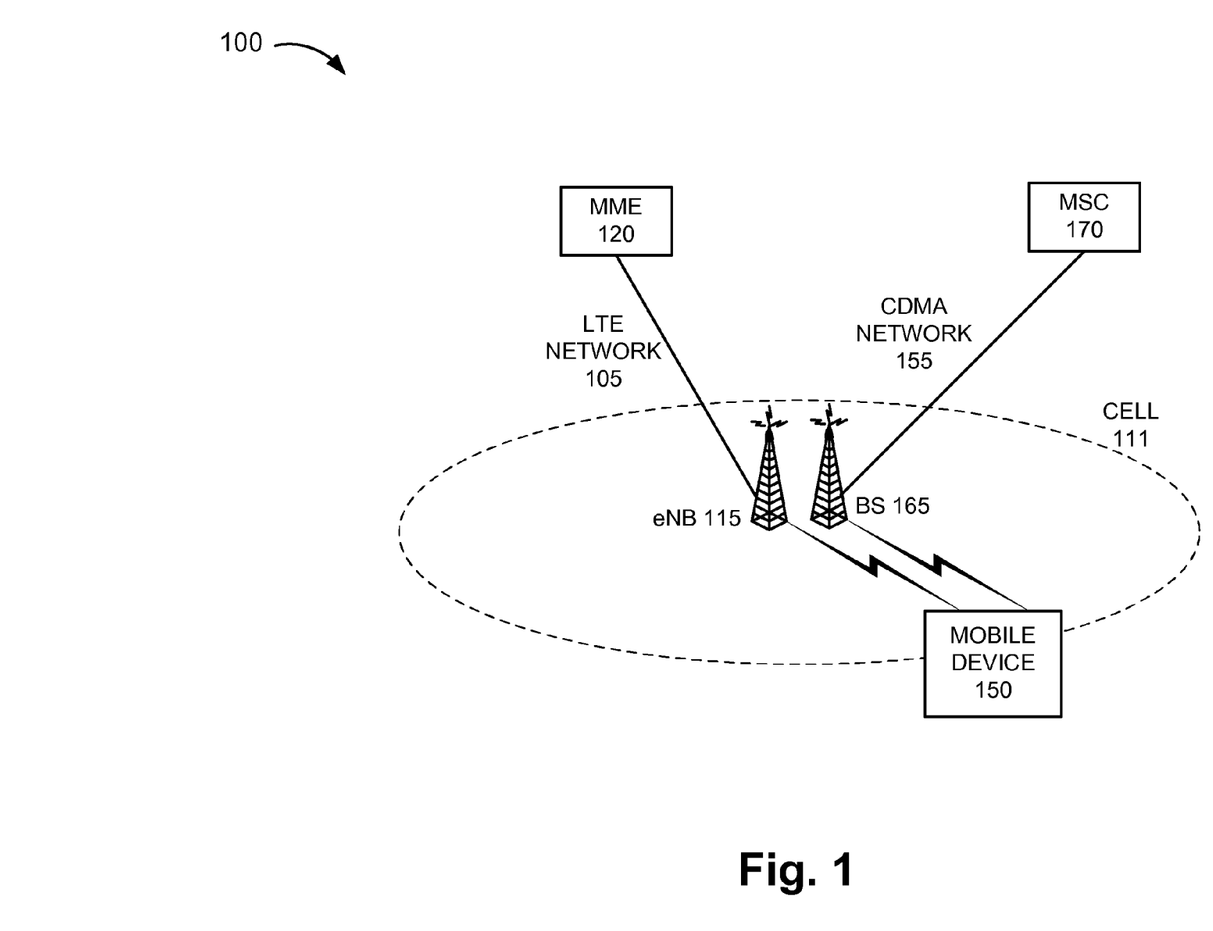
FIG. 1 is a diagram illustrating an exemplary environment in which exemplary embodiments of a tune away service may be implemented.

FIG. 1 is a diagram illustrating an exemplary environment 100 in which exemplary embodiments of a tune away service may be implemented. As illustrated, environment 100 includes an LTE network 105. LTE network 105 includes an eNB 115 and an MME 120. Additionally, environment 100 includes a CDMA network 155 (e.g., CDMA 2000—1×RTT). CDMA network 155 includes a base station (BS) 165 and a mobile switching center (MSC) 170. It may be assumed, although not illustrated, that other network elements (e.g., a base station controller, a packet data network gateway (PGW), etc.) exist in LTE network 105 and CDMA 155, respectively, but have been omitted for purposes of brevity. A cell 111 indicates a geographic area serviced by eNB 115 and base station 165. In this regard, eNB 115 and base station 165 may be considered co-located. As further illustrated, environment 100 includes a mobile device 150. Mobile device 150 has multimode capabilities that include both LTE and CDMA capabilities.

Environment 100 may be implemented to include wireless connections between mobile device 150 and networks 105 and 155. A connection may be direct or indirect and may involve an intermediary device and/or an intermediary network not illustrated in FIG. 1. Additionally, the number and the arrangement of connections between mobile device 150 and networks 105 and 155 are exemplary. Also, according to other embodiments, one or more functions and/or processes described as being performed by a particular device may be performed by a different device, or some combination of devices.

LTE network 105 and CDMA network 155 may share a common service provider. Alternatively, LTE network 105 and CDMA network 155 may each be associated with different service providers. Additionally, although according to an exemplary embodiment of FIG. 1, the networks described operate according to the LTE and CDMA standards, according to other embodiments, the networks may be different types of networks. For example, the networks may include a Universal Mobile Telecommunications System (UMTS) network, a Global System for Mobile Communications (GSM) network, a Wideband Code Division Multiple Access (WCDMA) network, a High-Speed Packet Access (HSPA) network, an Evolution Data Optimized (EV-DO) network, and/or another type of wireless network (e.g., an LTE Advanced network, or future generation wireless network architecture).

Given the wide variety of wireless networks that may be implemented in various embodiments, these networks may include various types of network devices, such as a base station, a base station controller, a home node B, a wireless relay node, a pico base station, a base transceiver station, a repeater, a user device gateway, a radio node, an anchor point, a wireless router, etc. Thus, although an exemplary embodiment of FIG. 1 includes a process or a function performed by eNB 115, according to other embodiments in which another type of network is implemented, the process or the function may be implemented by another type of network device.

Additionally, although environment 100 illustrates two networks (i.e., LTE network 105 and CDMA network 155), according to other embodiments, environment 100 may include an additional network (e.g., a third network, a fourth network, etc.). The additional network may be of a third type or may be of a type that is redundant relative to LTE network 105 or CDMA network 155. The use of a third network, a fourth network, etc., may depend on the multimode capabilities of mobile device 150.

ENB 115 and MME 120 operate according to the LTE standard or a variant thereof. Additionally, according to an exemplary embodiment, eNB 115 includes the functionality of tune away coordination. Base station 165 and MSC 170 operate according to the CDMA standard.

Mobile device 150 includes an end user device with wireless communicative capabilities. Mobile device 150 may be implemented to include a smartphone, a tablet device, a netbook, a vehicular communication system (e.g., an infotainment system) within a vehicle, a computer, a wrist device, or some other type of suitable wireless communicative device. According to an exemplary embodiment, mobile device 150 includes multiple communication interfaces. The communication interfaces operate according to at least two different communication standards. According to an exemplary implementation, mobile device 150 operates according to the LTE and CDMA standards.

An exemplary embodiment of the tune away service is described further below. FIGS. 2A-2D are diagrams illustrating exemplary implementations of an exemplary embodiment of the tune away service.

Figure 2A:
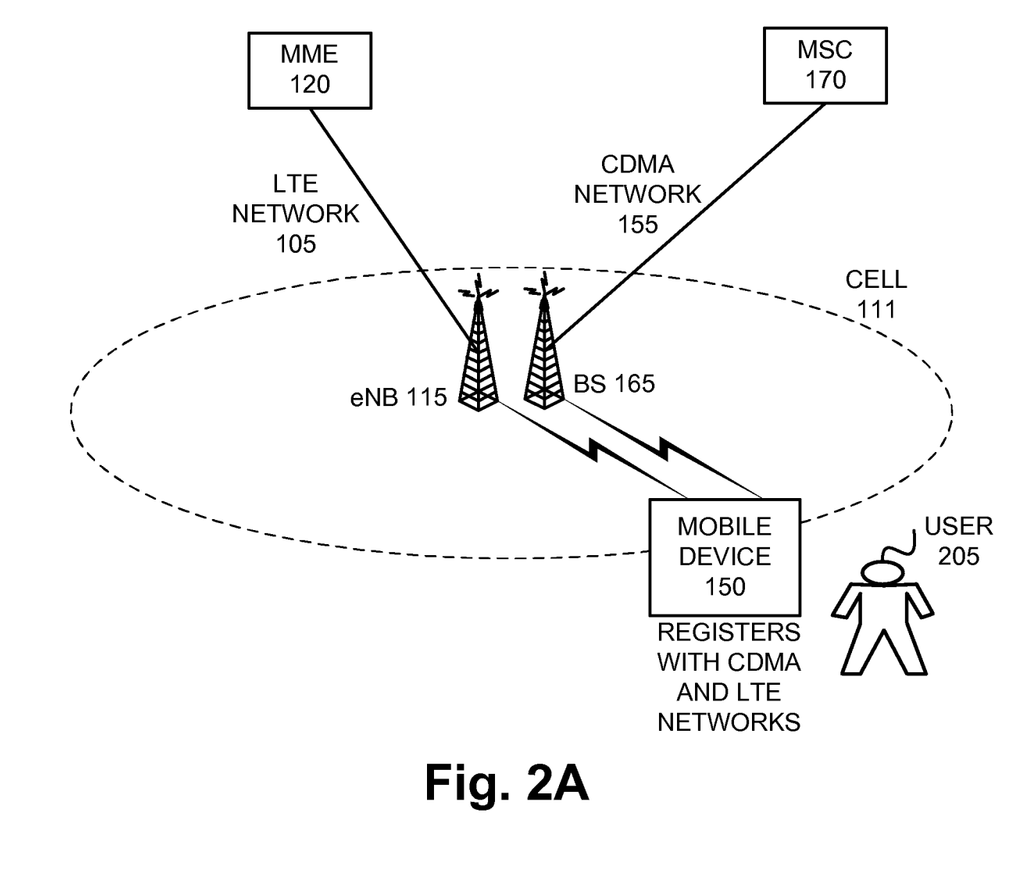
FIGS. 2A-2D are diagrams that illustrate exemplary processes pertaining to the tune away service.

Referring to FIG. 2A, a user 205 operates mobile device 150. Assume that mobile device 150 registers with CDMA network 155. For example, mobile device 150 performs a power-up registration. According to other scenarios, mobile device 150 may perform another form of registration supported by CDMA network 155, which may or may not be initiated by mobile device 150. According to this example, assume that during the registration, mobile device 150 informs base station 165 of its location and status so that base station 165 can page mobile station 150. A paging slot determination may be based on various parameters (e.g., slot cycle index (SCI), a mobile identification number (MIN), etc.), a hashing algorithm, etc., and may be configured at base station 165. Mobile device 150 listens on a paging channel during a particular time slot to acquire notification of a page.

Subsequently, mobile device 150 registers with LTE network 105 and establishes a radio resource connection (RRC) with eNB 115. According to an exemplary implementation, mobile device 150 informs eNB 115 of the type of mobile device 150. For example, mobile device 150 may transmit to eNB 115 a random access preamble message, an RRC connection request message, and an RRC connection complete message. Mobile device 150 may be configured to have one of these messages carry the type of mobile device information. As an example, the type of mobile device information may include the IMSI/TAC pertaining to mobile device 150 or a portion thereof. According to another implementation, mobile device 150 informs eNB 115 of the type of mobile device 150 using a proprietary message (e.g., a message not specified in the LTE standard).

The tuning away of a mobile device is not uniform among mobile devices. Additionally, according to this example, eNB 115 does not communicate with CDMA network (e.g., base station 165) to acquire the negotiated parameters of the tune away pertaining to mobile device 150. According to an exemplary embodiment, eNB 115 detects the tune away behavior of mobile device 150 based on messages received from mobile device 150. According to an exemplary embodiment, a message indicates to eNB 115 that mobile device 150 is going to tune away. In this way, eNB 115 may determine a tune away pattern of mobile device 150. According to an exemplary implementation, the CSI message transmitted from mobile device 150 to eNB 115 is used by eNB 115 to determine a tune away pattern. Typically, the periodic report configuration for CSI messaging is specified by a higher layer message (e.g., an RRC Connection Setup), which is transmitted from eNB 115 to mobile device 150. According to this example, assume that the tune away of mobile device 150 is periodic. Also, assume that the periodicity of the tune away is less frequent over time compared to the periodicity of CSI reporting. According to an exemplary embodiment, mobile device 150 transmits a CSI report or message, which includes a CSI value, to eNB 115. Mobile device 150 may transmit the CSI report via a Physical Uplink Control Channel (PUCCH) or via a Physical Uplink Shared Channel (PUSCH). The CSI report may include a Channel Quality Indicator (CQI), a Pre-Coding Matrix Indicator (PMI), and a Rank Indicator (RI). The exchange of tune away information may take place whenever there is a change in the tune away configuration (e.g., a change in paging slot cycle index), otherwise not. As an alternative, the tune away frequency and starting/end point can be included on other existing standard messages or new messages that have message integrity protection.

Figure 2B:
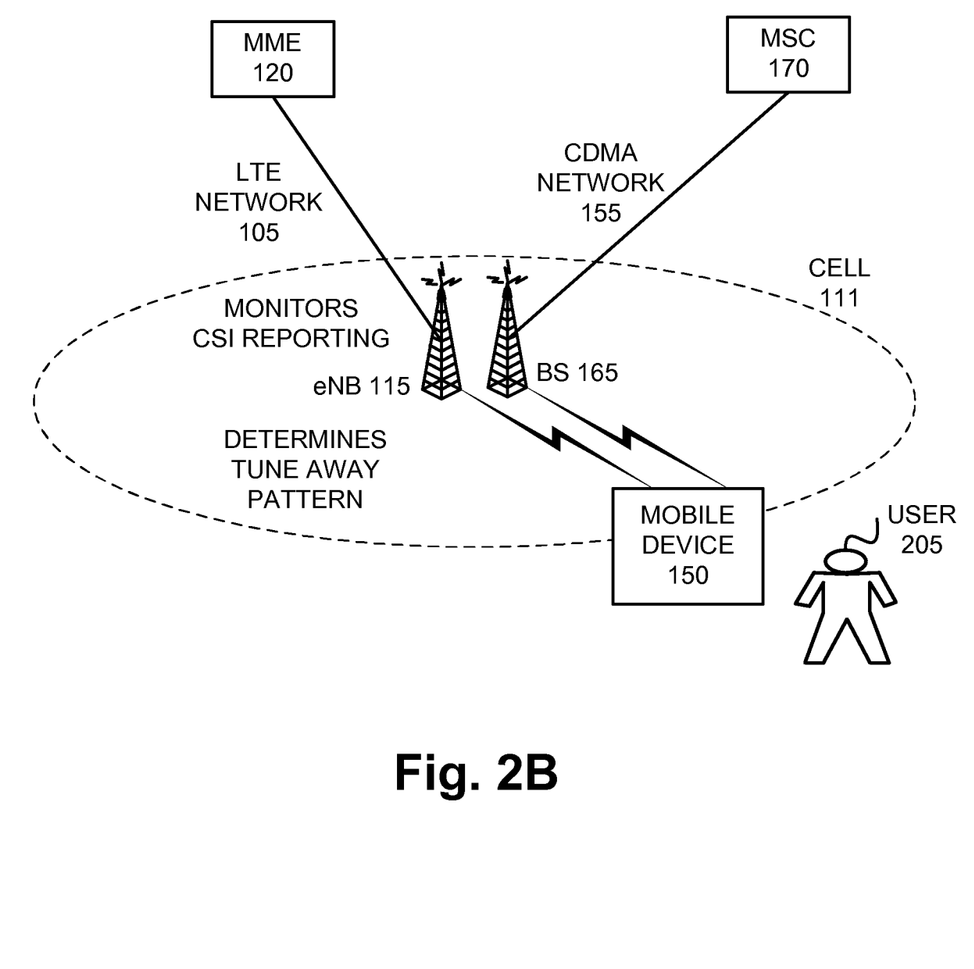

LTE supports wideband and sub-band CSI reporting. Typically, a wideband CSI report includes a CQI value that is represented as a single 4-bit integer. There are 16 different CQI values ranging from 0 to 15. A CQI value of 0 ordinarily indicates that the channel is inoperable (e.g., out of range). According to an exemplary implementation of the tune away process, mobile device 150 transmits the wideband CSI report that includes the CQI value of 0. The CQI value of 0 is interpreted by eNB 115 that mobile device 150 is going to tune away. That is, according to this example, eNB 115 periodically receives a wideband CSI report, which includes the CQI value of 0, from mobile device 150. Based on receiving multiple wideband CSI reports that include the CQI value of 0, eNB 115 is able to determine the tune away behavior of mobile device 150. For example, eNB 115 may determine a periodicity of the tune away (e.g., a tune away time slot) relative to the system time of LTE network 105. According to other implementations, in addition to or instead of CQI bits, other bits may be used to carry tune away and/or tune back information, such as PMI bits, RI bits, power profile indicator (PPI) bits, etc., in which particular values could be represented and interpreted by eNB 115.

As previously described, LTE also supports sub-band CSI reporting. A subband-level CSI report includes a CQI value for each subband. A UE selected subband CSI report includes a CQI value for M preferred subbands. The subband-level CSI report and the UE selected subband CSI report may use a 2-bit differential CQI value for each subband in which the differential is relative to a wideband CQI value. In a manner similar to that described above, the subband level CSI report or the UE selected subband CSI report may carry a value that indicates to eNB 115 that mobile device 150 is going to tune away. Additionally, or alternatively, the subband level CSI report or the UE selected subband CSI report may have a sufficient number of bits available to allow the paging configuration information of CDMA network 155 to be carried therein. Narrow band CQI information may be transmitted in the aperiodic reporting mode.

According to another exemplary embodiment, mobile device 150 notifies eNB 115 when mobile device 150 is tuning away and when mobile device 150 is tuning back. Mobile device 150 may use any of the messages described above. According to an exemplary implementation, the value for tune away and tune back are the same. For example, eNB 115 may interpret the first message as tune away, the second message as tune back, the third message as tune away, and so on and so forth. According to another exemplary implementation, the value for tune away and tune back are different. For example, with reference to the wideband CSI report, a CQI value of zero could indicate tune away and a CQI value of 15 could indicate tune back. Alternatively, mobile device 150 may use a new or different message to indicate tune away and tune back.

According to an exemplary embodiment, mobile device 150 transmits the messages that indicate tune away or tune away and tune back a certain number of times. That is, it may not be necessary for mobile device 150 to continuously transmit messages to eNB 115 to allow eNB 115 to determine the tune away pattern of mobile device 150. According to an exemplary implementation, the number of instances of tune away or tune away and tune back (and corresponding messages) are preconfigured on mobile device 150. In the case that the message carries the tune away start and periodicity, mobile device 150 may transmit the message only once unless there is a change in tune away configuration.

According to an exemplary embodiment, eNB 115 stores the tune away pattern data. According to an exemplary implementation, the tune away pattern data includes data pertaining to tune away and data that identifies the mobile device (e.g., IMSI/TAC). According to another exemplary implementation, the tune away pattern data includes data pertaining to tune away, data pertaining to tune back, and data that identifies the mobile device. According to an exemplary embodiment, eNB 115 stores the tune away pattern data in a database or some type of data structure (e.g., a table, etc.). According to an exemplary embodiment, eNB 115 determines the tune away or tune away and tune back behavior of mobile device based on the tune away pattern data. For example, eNB 115 analyzes the tune away pattern data to identify a periodicity of tune away exhibited by mobile device 150. According to an exemplary embodiment, eNB 115 generates absence data. The absence data indicates a time period in which mobile device 150 is tuned away and data that identifies mobile device 150. In terms of calculating the time period, when tune away data and tune back data exists, the time period can be calculated rather simply based on a time difference. However, in terms of calculating the time period when only tune away data is present, eNB 115 may assign an average tune away period value (e.g., a few milliseconds, etc.). The average tune away period value may be pre-configured on eNB 115 or derived based on mobile devices 150 that provide tune away data and tune back data.

Figure 2C:
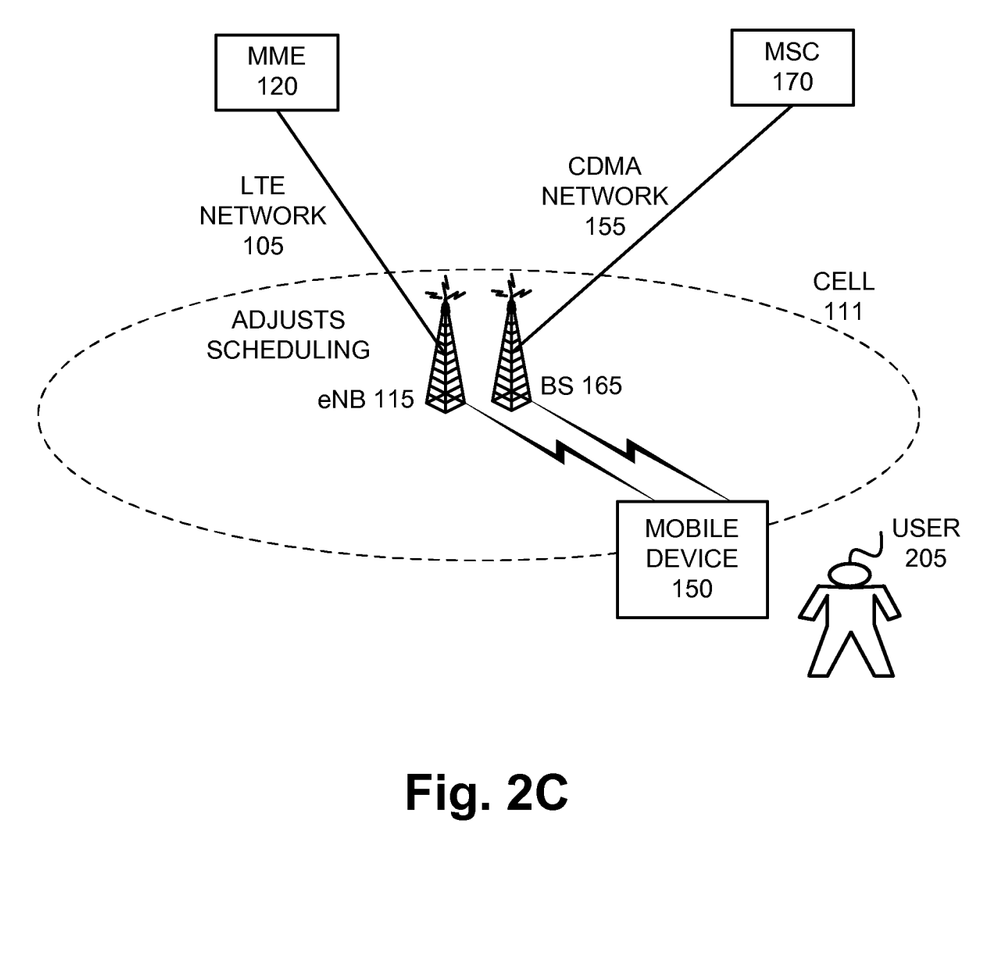

Referring to FIG. 2C, once eNB 115 determines the tune away behavior or tune away and tune back behavior of mobile device 150, eNB 115 may account for this behavior in relation to LTE operations. For example, eNB 115 may adjust its scheduling relative to the tune away behavior of mobile device 150. Typically, a MAC scheduler of eNB 115 (not illustrated) executes a scheduling algorithm which determines what data gets transmitted, when the data gets transmitted, and to what device. The MAC scheduler receives inputs from various sources in order to, among other things, calculate resource assignments for a downlink subframe and an uplink subframe.

According to an exemplary embodiment, the MAC scheduler receives, among other data, absence data. Based on the elements of a downlink channel and an uplink channel in the LTE (e.g., a frame, a subframe, a slot, a resource block), their time attributes (e.g., a frame is 10 milliseconds (ms), a subframe is 1 ms, a slot and a block is 0.5 ms, etc.) and the absence data, the MAC scheduler may optimize uplink and downlink assignments according to various metrics (e.g., capacity, throughput, etc.). The RRC layer and/or the MAC scheduler of eNB 115 may account for the tune away behavior of mobile device 150 in view of semi-persistent scheduling and/or dynamic scheduling.

Figure 2D:
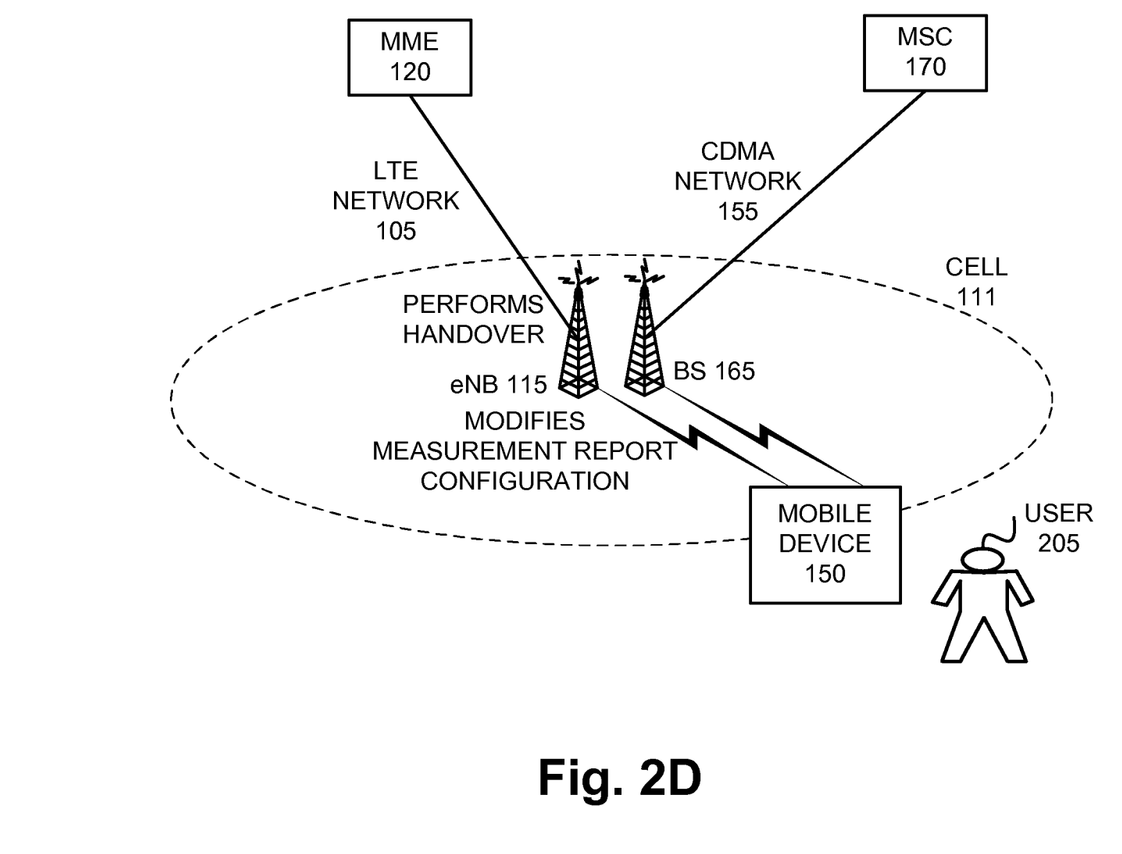

According to an exemplary embodiment, eNB 115 may make other types of adjustments pertaining to measurement report configurations, handover processes, etc., for which the tune away behavior is accounted. For example, the tune away behavior of mobile device 150 may negatively impact mobile device 150 when mobile device 150 is located in a radio frequency (RF)-challenged area. Referring to FIG. 2D, mobile device 150 provides measurement reports to eNB 115 based on a measurement report configuration provided to mobile device 150 by eNB 115. In view of the tune away configuration of mobile device 150 relative to CDMA network 155, mobile device 150 may miss providing a measurement report to eNB 115 due to the tuning away of mobile device 150. There can also be service impact (e.g., LTE drop call) due to handover failure resulting from mobile device 150 not being able to respond to handover commands from eNB 115 while mobile device 150 is tuned away.

According to an exemplary embodiment, eNB 115 modifies the measurement report configuration in view of a determined tune away pattern. For example, eNB 115 transmits an RRC Connection Reconfiguration message, which includes a modified measurement report configuration, to mobile device 150. In response to receiving the modified measurement report configuration, mobile device 150 adjusts its measure reporting. That is, mobile device 150 may not have to transmit a measurement report to eNB 115 during a period of time when mobile device 150 is tuned away.

Additionally, according to an exemplary embodiment, eNB 115 accounts for the tune away pattern of mobile device 150 in relation to handover procedures (e.g., intra-LTE, inter-RAT, blind handover). For example, eNB 115 transmits a handover command to mobile device 150 during suitable times relative to the tune away (e.g., after mobile device 150 tunes back, etc.). Alternatively, eNB 115 may expedite handover before an impending tune away period.

Although the above scenarios illustrated in FIGS. 2A-2D have been explained with respect to particular networks (e.g., LTE and CDMA), messages (e.g., CSI, etc.), and application (e.g., voice paging), according to other implementations, embodiments of the tune away service may be applied to different types of networks, messages, and applications. Additionally, according to other embodiments, the order of registration and messages transmitted may be different. For example, in contrast to the description in relation to FIG. 2A, according to other embodiments, mobile device 150 may register with LTE network 105 before registering with CDMA network 155.

Figure 3:
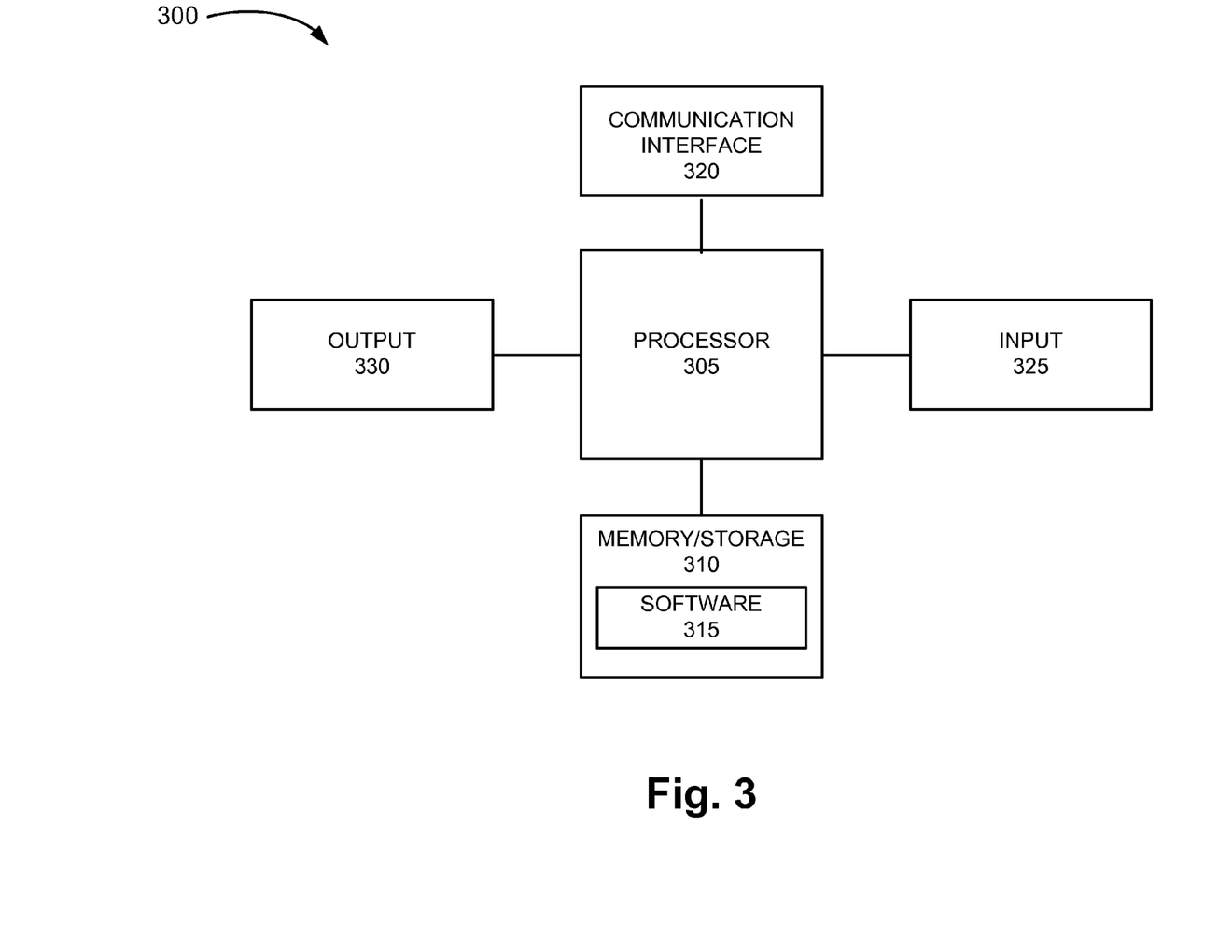
FIG. 3 is a diagram illustrating exemplary components of a device that may correspond to one or more of the devices in the exemplary environment.

FIG. 3 is a diagram illustrating exemplary components of a device 300 that may correspond to one or more of the devices in the environments described herein. For example, device 300 may correspond to network devices of LTE network 105, such as eNB 115 and MME 120, network devices of CDMA network 155, such as base station 165 and MSC 170, and mobile device 150. As illustrated, according to an exemplary embodiment, device 300 includes a processor 305, memory/storage 310 that stores software 315, a communication interface 320, an input 325, and an output 330. According to other embodiments, device 300 may include fewer components, additional components, different components, and/or a different arrangement of components than those illustrated in FIG. 3 and described herein.

Processor 305 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (e.g., one or multiple cores), microcontrollers, and/or some other type of component that interprets and/or executes instructions and/or data. Processor 305 may be implemented as hardware (e.g., a microprocessor, etc.), a combination of hardware and software (e.g., a SoC, an ASIC, etc.), may include one or multiple memories (e.g., cache, etc.), etc.

Processor 305 may control the overall operation or a portion of operation(s) performed by device 300. Processor 305 may perform one or multiple operations based on an operating system and/or various applications or programs (e.g., software 315). Processor 305 may access instructions from memory/storage 310, from other components of device 300, and/or from a source external to device 300 (e.g., a network, another device, etc.).

Memory/storage 310 includes one or multiple memories and/or one or multiple other types of storage mediums. For example, memory/storage 310 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a phase-change memory (PCM), a dual in-line memory module (DIMM), a flash memory, and/or some other type of memory. Memory/storage 310 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 310 may include drives for reading from and writing to the storage medium.

Memory/storage 310 may be external to and/or removable from device 300, such as, for example, a Universal Serial Bus (USB) memory stick, a dongle, a hard disk, mass storage, off-line storage, or some other type of storing medium (e.g., a compact disk (CD), a digital versatile disk (DVD), a Blu-Ray® disk (BD), etc.). Memory/storage 310 may store data, software, and/or instructions related to the operation of device 300.

Software 315 includes an application or a computer program that provides a function and/or a process. Software 315 may include firmware. For example, with reference to mobile device 150, software 315 may include an application that, when executed by processor 315, provides the functions as described herein. Additionally, for example, with reference to eNB 115, software may include an application that, when executed by processor 315, provides the functions as described herein.

Communication interface 320 permits device 300 to communicate with other devices, networks, systems, etc. Communication interface 320 may include one or multiple wireless interfaces and/or wired interfaces. Communication interface 320 may include one or multiple transmitters and receivers or transceivers. Communication interface 320 may operate according to a protocol and a communication standard. As previously described, according to an exemplary embodiment, mobile device 150 includes multiple communication interfaces 320.

Input 325 permits an input into device 300. For example, input 325 may include a keyboard, a mouse, a display, a touchscreen, a touchless screen, a button, a switch, an input port, speech recognition logic, and/or some other type of visual, auditory, tactile, etc., input component. Output 330 permits an output from device 300. For example, output 330 may include a speaker, a display, a touchscreen, a touchless screen, a light, an output port, and/or some other type of visual, auditory, tactile, etc., output component.

Device 300 may perform a process and/or a function, as described herein, in response to processor 305 executing software 315 stored by memory/storage 310. By way of example, instructions may be read into memory/storage 310 from another memory/storage 310 (not shown) or read from another device (not shown) via communication interface 320. The instructions stored by memory/storage 310 may cause processor 305 to perform a process described herein. Alternatively, for example, according to other implementations, device 300 may perform a process described herein based on the operation of hardware (processor 305, etc.).

Figure 4A:
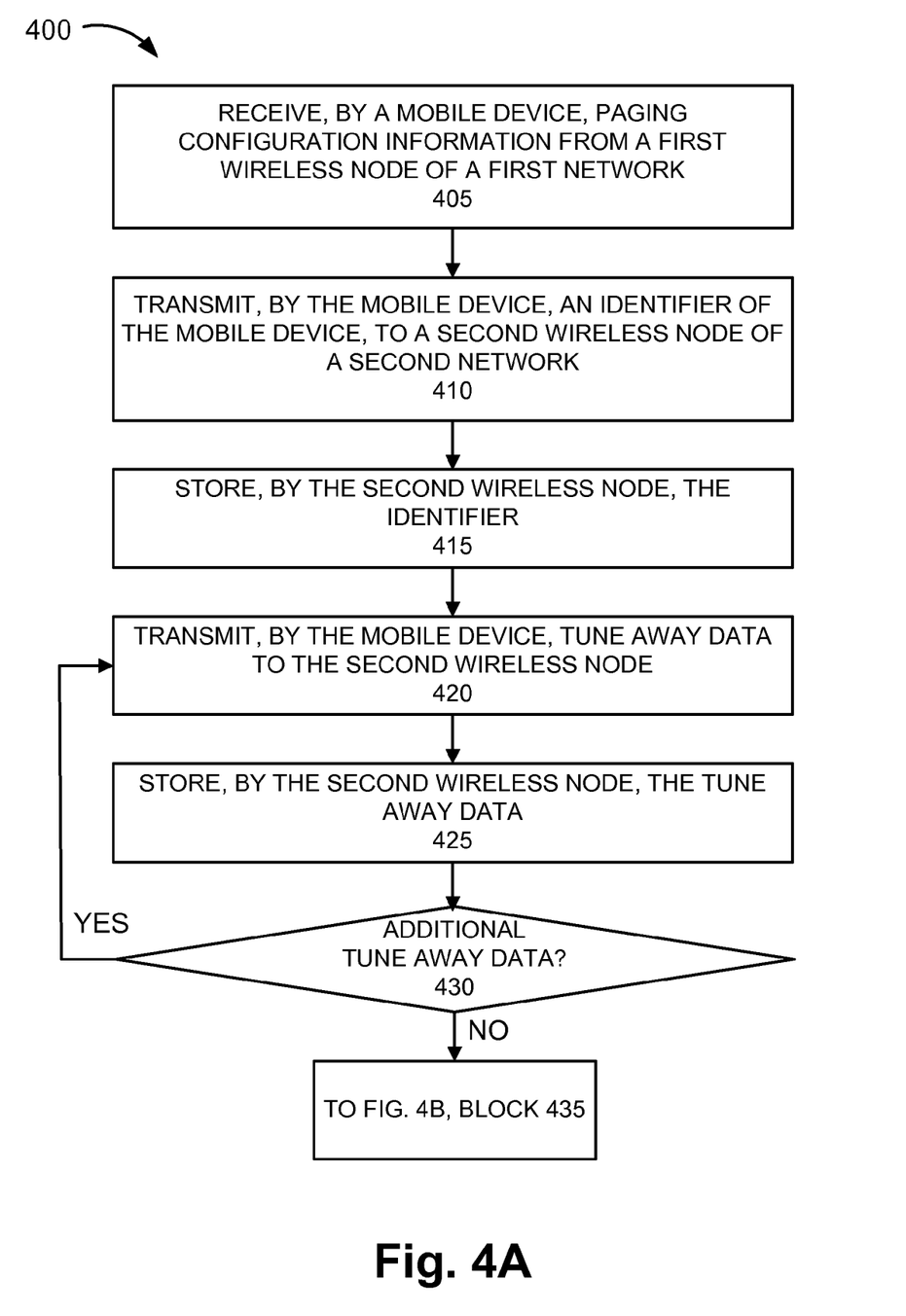
FIGS. 4A and 4B are flow diagrams that illustrate an exemplary process pertaining to the tune away service.
Figure 4B:
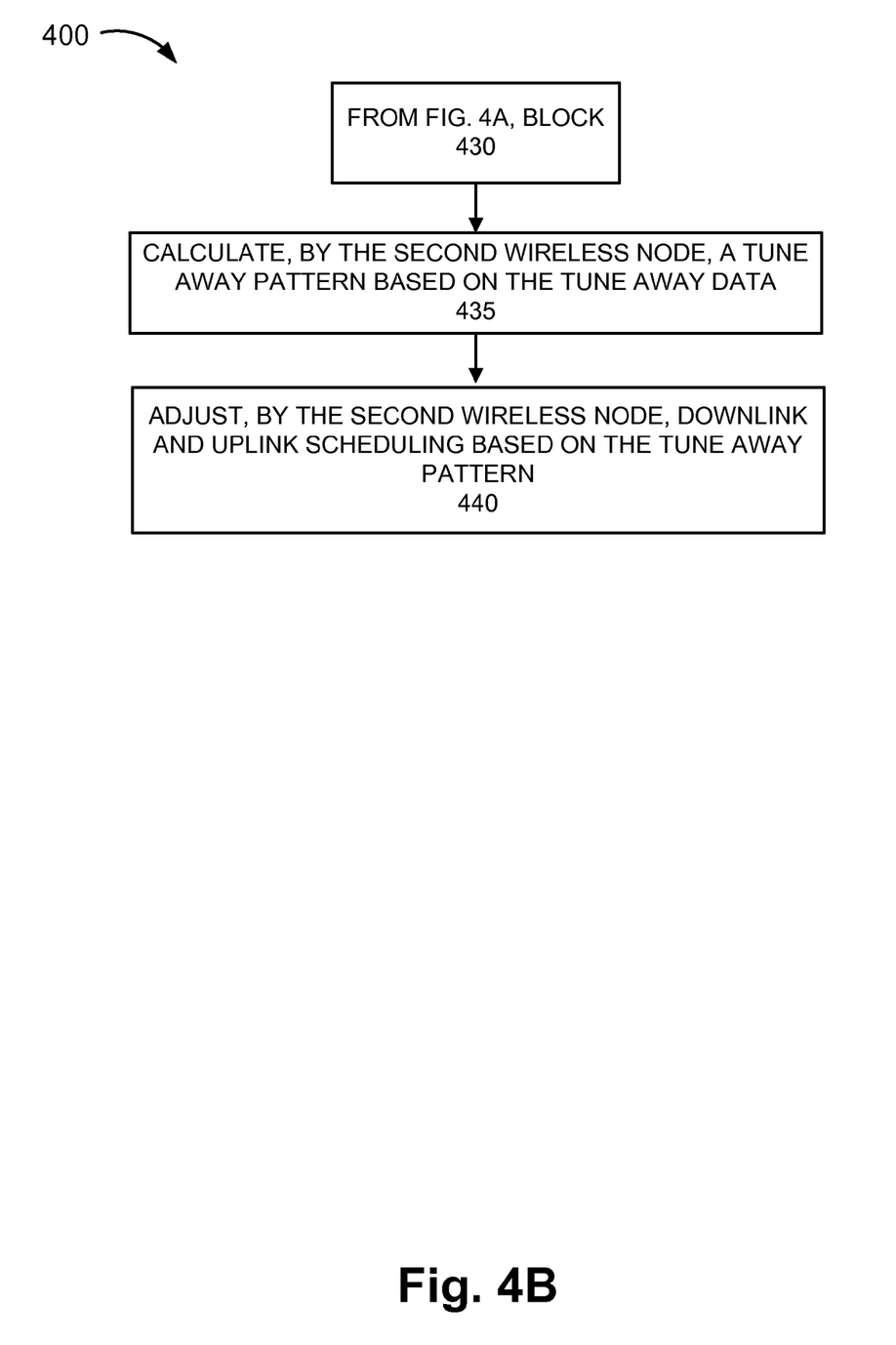

FIGS. 4A and 4B are flow diagrams illustrating an exemplary process 400 pertaining to the tune away service. Process 400 is directed to a process previously described above with respect to FIGS. 2A-2D and elsewhere in this description, in which tune away data is provided by a mobile device to a wireless node and used by the wireless node to adjust network processes, as described herein. According to an exemplary embodiment, the mobile device is a multi-mode device and performs some of the steps described in process 400. Additionally, according to an exemplary embodiment, the wireless node performs some of the steps described in process 400. For example, processor 305 may execute software 315 to perform the steps described.

Referring to FIG. 4A, process 400 may begin with receiving, by a mobile device, paging configuration information from a first wireless node of a first network (block 405). For example, mobile device 150 registers with CDMA network 155. Mobile device 150 receives paging configuration information from base station 165 of CDMA network 155.

In block 410, an identifier of the mobile device is transmitted, by the mobile device, and to a second wireless node of a second network. For example, mobile device 150 transmits an IMSI/TAC or a portion thereof, to eNB 115 of LTE network 105.

In block 415, the identifier is stored by the second wireless node. For example, eNB 115 stores the identifier that identifies mobile device 150.

In block 420, tune away data is transmitted, by the mobile device, to the second wireless node. For example, mobile device 150 transmits tune away data that indicates mobile device 150 is going to tune away. As an example, a CSI message or a dedicated message may used to carry the tune away data. Subsequently, mobile device 150 tunes away to base station 165 of CDMA network 155.

In block 425, the tune away data is stored by the second wireless node. For example, eNB 115 stores the tune away data. ENB 115 may correlate the identifier of mobile device 150 with the tune away data. For example, eNB 115 may store the identifier and the tune away data in a database or some type of data structure.

In block 430, it is determined whether additional tune away data should be transmitted. For example, subsequent to tuning back to eNB 115 of LTE network 105, mobile device 150 determines whether additional tune away data is to be transmitted to eNB 115. For example, mobile device 150 may use a counter and/or a value to determine whether additional occurrences of tune away are to be reported to eNB 115. In this way, eNB 115 may have sufficient tune away data to calculate the tune away pattern of mobile device 150.

If it is determined that additional tune away data should be transmitted (block 420—YES), then process 400 continues to block 420. If it is determined that additional tune away data should not be transmitted (block 420-NO), then process 400 continues to block 435 of FIG. 4B. As illustrated, in block 435, a tune away pattern is calculated, by the second wireless data, based on the tune away data. For example, eNB 115 analyzes the tune away pattern data to identify a periodicity of tune away exhibited by mobile device 150. Based on the analysis, eNB 115 generates absence data. The absence data indicates a time period in which mobile device 150 is tuned away and data that identifies mobile device 150.

In block 440, downlink and uplink scheduling is adjusted, by the second wireless node, based on the tune away pattern. The RRC layer and/or the MAC scheduler of eNB 115 may account for the tune away behavior of mobile device 150 in view of semi-persistent scheduling and/or dynamic scheduling.

Although FIGS. 4A and 4B illustrate an exemplary tune away process 400, according to other embodiments, process 400 may include additional operations, fewer operations, and/or different operations than those illustrated in FIGS. 4A and 4B and described herein. For example, according to other embodiments, mobile device 150 may transmit tune back data to eNB 115. ENB 115 uses the tune away data and tune back data to determine the tune away pattern of mobile device 150, as previously described. Additionally, or alternatively, eNB 115 modifies the measurement report configuration in view of a determined tune away pattern and/or accounts for tune away in view of handover process, as previously described.

The foregoing description of embodiments provides illustration, but is not intended to be exhaustive or to limit the embodiments to the precise form disclosed. Accordingly, modifications to the embodiments described herein may be possible. For example, mobile device 150 may automatically suspend critical activities before a tune away. For example, mobile device 150 may suspend performing a handover. In this way, mobile device 150 may tune away and tune back, and then perform a handover so that the handover process can be carried out in an uninterrupted manner. According to another example, mobile device 150 may suspend establishing a radio connection with the LTE network. Similarly, mobile device 150 may tune away and tune back, and then perform an RC process. The suspension of activities (e.g., critical) may minimize interruption of a process (e.g., due to loss of signaling, etc.).

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items.

In addition, while series of blocks have been described with regard to the processes illustrated in FIGS. 4A and 4B, the order of the blocks may be modified according to other embodiments. Further, non-dependent blocks may be performed in parallel. Additionally, other processes described in this description may be modified and/or non-dependent operations may be performed in parallel.

The embodiments described herein may be implemented in many different forms of software and/or firmware executed by hardware. For example, a process or a function may be implemented as "logic" or as a "component." The logic or the component may include, for example, hardware (e.g., processor 305, etc.), or a combination of hardware and software (e.g., software 315). The embodiments have been described without reference to the specific software code since the software code can be designed to implement the embodiments based on the description herein and commercially available software design environments/languages.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded as illustrative rather than restrictive.

In the specification and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Additionally, embodiments described herein may be implemented as a non-transitory storage medium that stores data and/or information, such as instructions, program code, data structures, program modules, an application, etc. A non-transitory storage medium includes one or more of the storage mediums described in relation to memory/storage 310.

No element, act, or instruction described in the present application should be construed as critical or essential to the embodiments described herein unless explicitly described as such.

What is claimed is:

1. A method comprising:
   establishing, by a wireless node of a first network, a wireless connection with a mobile device, wherein the mobile device is a multimode device;
   receiving, by the wireless node, first tune away data included in a first channel state information (CSI) report from the mobile device,
   wherein the first tune away data indicates that the mobile device is going to tune away to a second network and offset data that indicates a timing offset relative to a time reference of the first network at which the mobile device is to begin to tune away to the second network,
   wherein the first network and the second network operate according to different communication standards, and the first CSI report includes a first channel quality indicator value, a first pre-coding matrix indicator value, and a first rank indicator value that indicates the first tune away data;
   receiving, by the wireless node, an identifier of the mobile device;
   storing, by the wireless node, the first tune away data;
   receiving, by the wireless node, second tune away data included in a second CSI report from the mobile device, wherein the second tune away data indicates that the mobile device is going to tune away again to the second network, and wherein the second CSI report includes a second channel quality indicator value, a second pre-coding matrix value, and a second rank indicator value that indicates the second tune away data;
   storing, by the wireless node, the second tune away data;
   storing, by the wireless node, the identifier of the mobile device with the first tune away data and the second tune away data;
   calculating, by the wireless node, a tune away pattern of the mobile device based on the first tune away data and the second tune away data;
   storing, by the wireless node, tune away pattern data of the mobile device;
   adjusting, by the wireless node, at least one of a downlink scheduling or an uplink scheduling pertaining to the mobile device based on the tune away pattern data of the mobile device; and
   transmitting a modified measurement reporting configuration, to the mobile device, based on the tune away pattern data.

2. The method of claim 1, wherein the first CSI report and the second CSI report are wideband CSI reports.

3. The method of claim 1, wherein the first CSI report and the second CSI report are sub-band CSI reports.

4. The method of claim 1, wherein the identifier includes at least one of an International Mobile Subscriber Identity (IMSI) or a Type Allocation Code (TAC) of the mobile device.

5. The method of claim 1, further comprising:
   adjusting a handover procedure pertaining to the mobile device based on the tune away pattern data.

6. The method of claim 1, further comprising:
   generating absence data based on the first tune away data and the second tune away data, wherein the absence data includes an indication of a time period that the mobile device is tuned away from the wireless node.

7. The method of claim 1, wherein
   the first channel quality indicator value is a different value than the second channel quality indicator value.

8. A wireless node comprising:
   a communication interface;
   a memory, wherein the memory stores instructions; and
   a processor, wherein the processor executes the instructions to:
   establish, via the communication interface, a wireless connection with a mobile device, wherein the mobile device is a multimode device;
   receive, via the communication interface, first tune away data included in a first channel state information (CSI) report from the mobile device,
   wherein the first tune away data indicates that the mobile device is going to tune away to a second network and offset data that indicates a timing offset relative to a time reference of the first network at which the mobile device is to begin to tune away to the second network,
   wherein the wireless node is of a first network, and the first network and the second network operate according to different communication standards, and the first CSI report includes a first channel quality indicator value, a first pre-coding matrix indicator value, and a first rank indicator value that indicates the first tune away data;
receive an identifier of the mobile device;
store the first tune away data;
receive second tune away data included in a second CSI report from the mobile device,
wherein the second tune away data indicates that the mobile device is going to tune away again to the second network, and wherein the second CSI report includes a second channel quality indicator value, a second pre-coding matrix value, and a second rank indicator value that indicates the second tune away data;
store the second tune away data;
store the identifier of the mobile device with the first tune away data and the second tune away data;
calculate a tune away pattern of the mobile device based on the first tune away data and the second tune away data;
store, in response to the calculation, tune away pattern data that includes an indication of the tune away pattern of the mobile device;
adjust at least one of a downlink scheduling or an uplink scheduling pertaining to the mobile device based on the tune away pattern data; and
transmit, via the communication interface, a modified measurement reporting configuration based on the tune away pattern data.

9. The wireless node of claim 8, wherein the wireless node is an enhanced node B of a Long Term Evolution network, and wherein the first CSI report and the second CSI report are wideband CSI reports.

10. The wireless node of claim 8, wherein the identifier includes at least one of an International Mobile Subscriber Identity (IMSI) or a Type Allocation Code (TAC) of the mobile device.

11. The wireless node of claim 8, wherein the first CSI report and the second CSI report are sub-band CSI reports, and wherein the processor further executes the instructions to:
adjust a handover procedure pertaining to the mobile device based on the tune away pattern data.

12. The wireless node of claim 8, wherein the
identifier is received in one of a random access preamble message, a radio resource control (RRC) connection request, or an RRC connection complete message.

13. The wireless node of claim 8, wherein the processor further executes the instructions to:
generate absence data based on the first tune away data and the second tune away data, wherein the absence data includes an indication of a time period that the mobile device is tuned away from the wireless node.

14. The wireless node of claim 8, wherein, when calculating, the processor further executes the instructions to:
identify a periodicity of tune away pertaining to the mobile device.

15. A non-transitory storage medium that stores instructions executable by a processor of a computational device, which when executed, cause the computational device to:
establish a wireless connection with a mobile device, wherein the mobile device is a multimode device;
receive first tune away data included in a first channel state information (CSI) report from the mobile device, wherein the first tune away data indicates that the mobile device is going to tune away to a second network and offset data that indicates a timing offset relative to a time reference of the first network at which the mobile device is to begin to tune away to the second network,
wherein the computational device is of a first network, and the first network and the second network operate according to different communication standards, and the first CSI report includes a first channel quality indicator value, a first pre-coding matrix indicator value, and a first rank indicator value that indicates a portion of the first tune away data;
store the first tune away data;
receive an identifier of the mobile device;
receive second tune away data included in a second CSI report from the mobile device, wherein the second tune away data indicates that the mobile device is going to tune away again to the second network, and wherein the second CSI report includes a second channel quality indicator value, a second pre-coding matrix value, and a second rank indicator value that indicates the second tune away data;
store the second tune away data;
store the identifier of the mobile device with the first tune away data and the second tune away data;
calculate a tune away pattern of the mobile device based on the first tune away data and the second tune away data;
store, in response to the calculation, tune away pattern data of the mobile device, wherein the tune away pattern data indicates a periodicity of tune away by the mobile device;
adjust at least one of a downlink scheduling or an uplink scheduling pertaining to the mobile device based on the tune away pattern data; and
transmit a modified measurement reporting configuration based on the tune away pattern data.

16. The non-transitory storage medium of claim 15, further storing instructions executable by the processor of the computational device, which when executed, cause the computational device to:
wherein the first channel quality indicator value of the first CSI report has a value of zero, and the second channel quality indicator value of the second CSI report has a value of zero.

17. The non-transitory storage medium of claim 15, further storing instructions executable by the processor of the computational device, which when executed, cause the computational device to:
adjust a handover procedure pertaining to the mobile device based on the tune away pattern data, and wherein the first CSI report and the second CSI report are wideband CSI reports.

18. The non-transitory storage medium of claim 15, wherein the identifier includes at least one of an International Mobile Subscriber Identity (IMSI) or a Type Allocation Code (TAC) of the mobile device.

19. The non-transitory storage medium of claim 15,
wherein the second tune away data indicates that the mobile device is going to tune back to the computational device relative to the first tune away data,
wherein a the first channel quality indicator value is a different value than the second channel quality indicator value.

20. The non-transitory storage medium of claim 15, wherein the first CSI report and the second CSI report are sub-band CSI reports.

* * * * *